(12) United States Patent
Sun et al.

(10) Patent No.: US 11,831,240 B2
(45) Date of Patent: Nov. 28, 2023

(54) PARALLEL OUTPUT CONVERTERS CONNECTED TO A SPLIT MIDPOINT NODE ON AN INPUT CONVERTER

(71) Applicant: Silergy Semiconductor Technology (Hangzhou) LTD, Hangzhou (CN)

(72) Inventors: Junyan Sun, Hangzhou (CN); Wang Zhang, Hangzhou (CN); Chen Zhao, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 2 days.

(21) Appl. No.: 17/551,453

(22) Filed: Dec. 15, 2021

(65) Prior Publication Data
US 2022/0209660 A1  Jun. 30, 2022

(30) Foreign Application Priority Data

Dec. 30, 2020 (CN) .......................... 202011609888.0

(51) Int. Cl.
*H02M 3/07* (2006.01)
*H02M 3/158* (2006.01)
*H02M 1/00* (2006.01)

(52) U.S. Cl.
CPC ........... *H02M 3/158* (2013.01); *H02M 1/007* (2021.05); *H02M 3/072* (2021.05); *H02M 1/0095* (2021.05)

(58) Field of Classification Search
CPC ........... H02M 3/07–078; H02M 1/007; H02M 3/1584–1586
See application file for complete search history.

(56) References Cited

U.S. PATENT DOCUMENTS

| | | | |
|---|---|---|---|
| 8,581,518 B2 | 11/2013 | Kuang et al. | |
| 10,547,241 B1* | 1/2020 | Li | H02M 3/1588 |
| 2011/0127925 A1 | 6/2011 | Huang et al. | |
| 2017/0318639 A1 | 11/2017 | Wang et al. | |
| 2018/0026518 A1* | 1/2018 | Liu | H02M 3/158 |
| | | | 323/312 |
| 2018/0295685 A1 | 10/2018 | Wang et al. | |
| 2018/0295690 A1 | 10/2018 | Chen et al. | |
| 2018/0310376 A1 | 10/2018 | Huang et al. | |
| 2020/0099302 A1* | 3/2020 | Webb | H02M 3/158 |
| 2022/0029540 A1 | 1/2022 | Zhang et al. | |

FOREIGN PATENT DOCUMENTS

CN  107346940 A  11/2017
CN  108566092 B  9/2018

* cited by examiner

*Primary Examiner* — Peter M Novak

(57) ABSTRACT

A power converter can include: positive and negative input terminals configured to receive an input voltage; positive and negative output terminals configured to generate an output voltage; first and second power switches sequentially coupled in series between the positive input terminal and a first node; third and fourth power switches sequentially coupled in series between a second node and the negative input terminal, where there is no physical connection between the first node and the second node; a first energy storage element coupled between a common terminal of the first and second power switches and a common terminal of the third and fourth power switches; a first multi-level power conversion circuit coupled between the first node and the positive output terminal; and a second multi-level power conversion circuit coupled between the first node and the positive output terminal.

19 Claims, 13 Drawing Sheets

US 11,831,240 B2

PARALLEL OUTPUT CONVERTERS CONNECTED TO A SPLIT MIDPOINT NODE ON AN INPUT CONVERTER

RELATED APPLICATIONS

This application claims the benefit of Chinese Patent Application No. 202011609888.0, filed on Dec. 30, 2020, which is incorporated herein by reference in its entirety.

FIELD OF THE INVENTION

The present invention generally relates to the field of power electronics, and more particularly to power converters.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
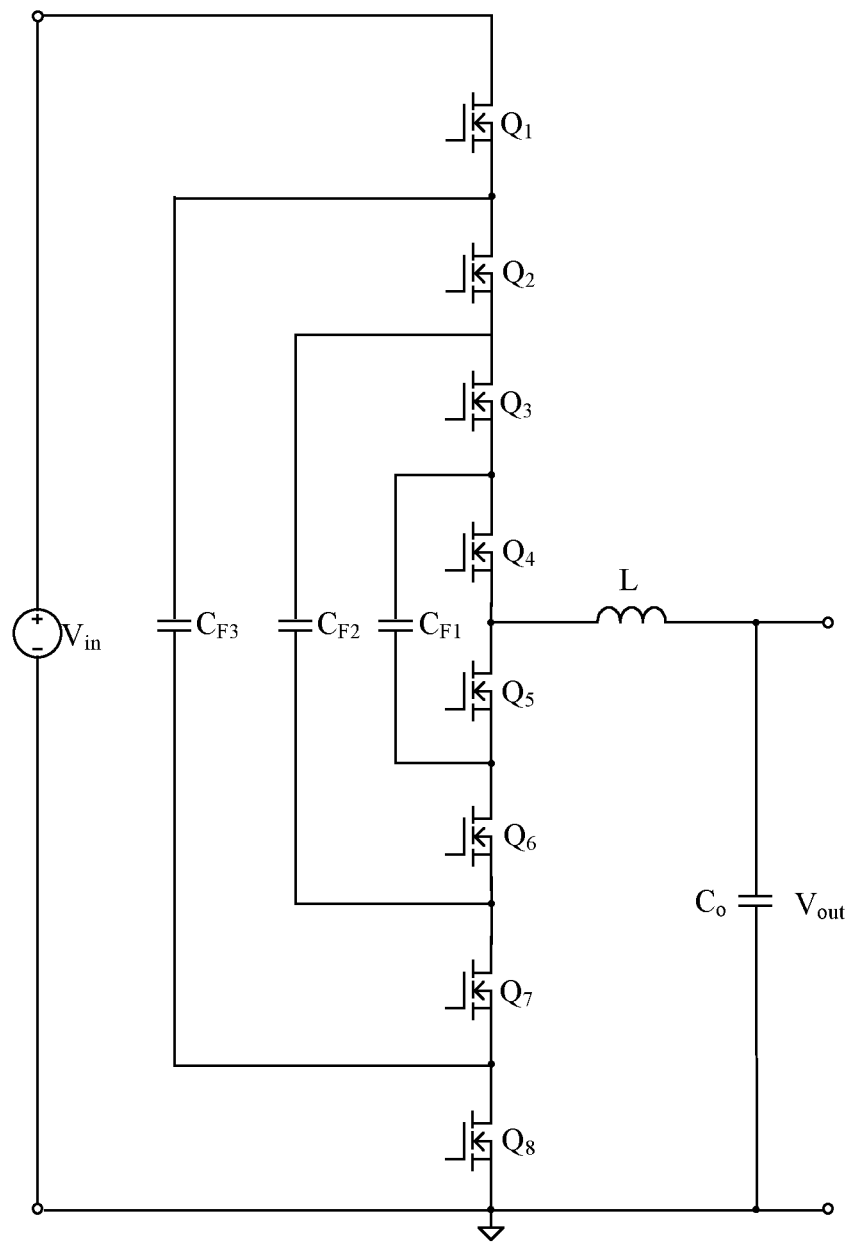
FIG. 1 is a schematic diagram of an example power converter.

With the continued development of society, energy shortages have become a primary problem. Power electronics technology has quickly developed in recent years, and efficient power converters are an indispensable part of energy utilization. Referring now to FIG. 1, shown is a schematic diagram of an example power converter. The power converter can include power switches Q1-Q8, flying capacitors CF1-CF3, inductor L, and output capacitor Co. Power switches Q1-Q8 can connect in series between a positive input terminal of the power converter and the ground, in order to receive input voltage Vin. Flying capacitor CF3 can connect to the common terminal of power switches Q1 and Q2 and the common terminal of power switches Q7 and Q8. Flying capacitor CF2 can connect between the common terminal of power switches Q2 and Q3 and the common terminal of power switches Q6 and Q7. Flying capacitor CF1 can connect between the common terminal of power switches Q3 and Q4 and the common terminal of power switches Q5 and Q6. One terminal of inductor L can connect to the common terminal of power switches Q4 and Q5, and the other terminal of inductor L can connect to a positive output terminal of the power converter. Output capacitor Co can connect between the positive output terminal of the power converter and the ground to obtain output voltage Vout. This example power converter can efficiently achieve a voltage conversion of 4:1. That is, the ratio of input voltage Vin to output voltage Vout is 4:1. However, this arrangement requires 8 power switches to be coupled in series, and multiple power switches coupled in series may cause the implementation of the driving circuit to be more complicated. As such, the number of power switches coupled in series should be minimized.

Figure 2:
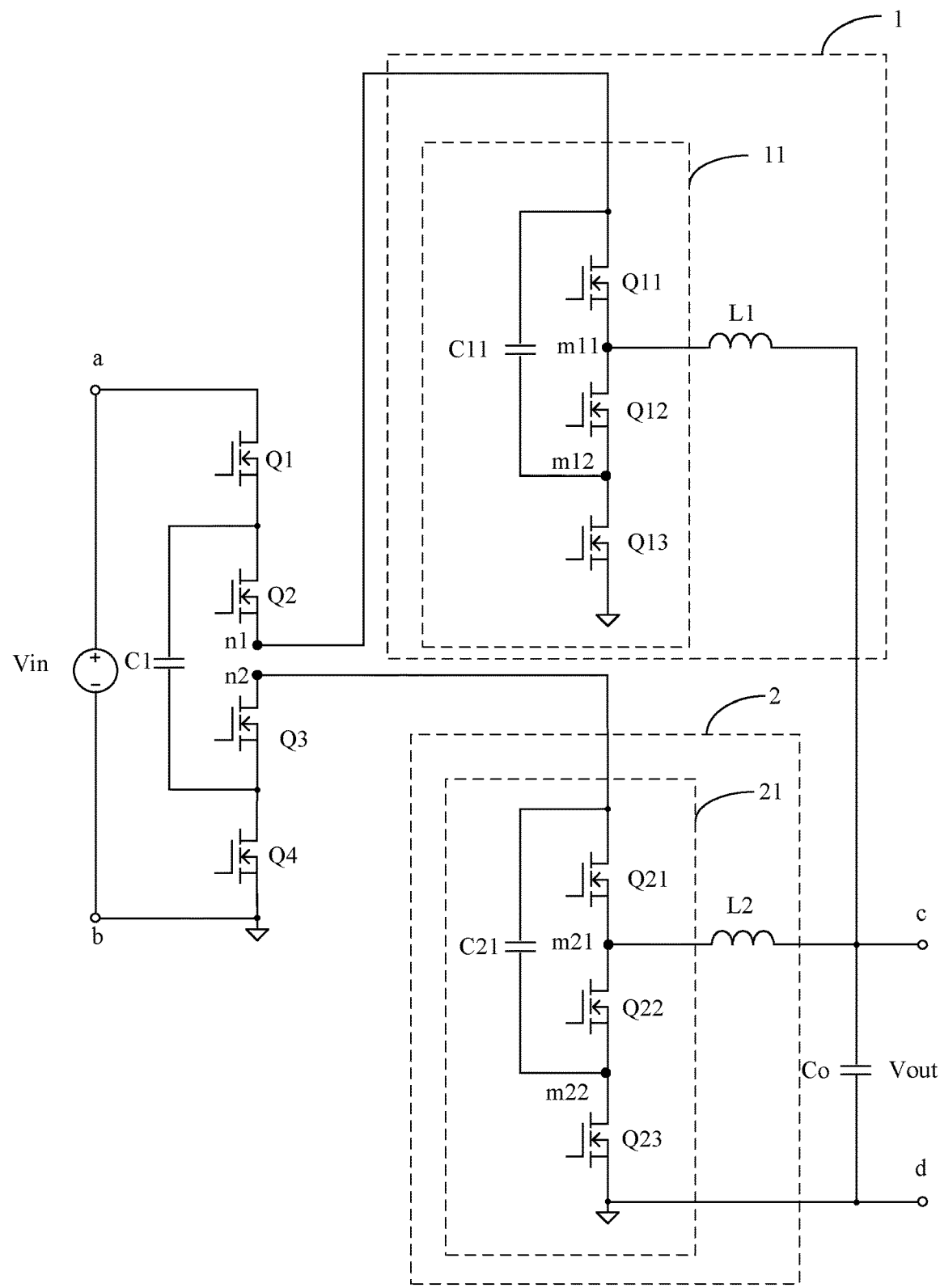
FIG. 2 is a schematic diagram of a first example power converter, in accordance with embodiments of the present invention.

Referring now to FIG. 2, shown is a schematic diagram of a first example power converter, in accordance with embodiments of the present invention. In this particular example, the power converter can include positive input terminal a and negative input terminal b for receiving input voltage Vin, and positive output terminal c and negative output terminal d for generating output voltage Vout. Also, power switches Q1 and Q2 can be sequentially coupled in series between positive input terminal a and node n1, and power switches Q3 and Q4 may be sequentially coupled in series between node n2 and negative input terminal b. Energy storage element C1 can connect between the common terminal of power switches Q1 and Q2 and the common terminal of power switches Q3 and Q4. Multi-level power conversion circuit 1 can be coupled between node n1 and positive output terminal c and can include magnetic element L1. Multi-level power conversion circuit 2 can be coupled between node n2 and positive output terminal c and can include magnetic element L2. A load (not shown) can connect between positive output terminal c and negative output terminal d.

Further, the duty cycles of power switches Q1, Q2, Q3, and Q4 may be the same. In addition, the switching states of power switches Q1 and Q3 can be the same, and the switching states of power switches Q2 and Q4 can be the same. Power switches Q1 and Q2 may be turned on and off with a phase difference. For example, multi-level power conversion circuit 1 can also include switched capacitor circuit 11, and multi-level power conversion circuit 2 can also include switched capacitor circuit 22. In this example, a first terminal of switched capacitor circuit 11 can connect to node n1, and a second terminal of switched capacitor circuit 11 can connect to one terminal of magnetic element L1. The other terminal of magnetic element L1 can connect to positive output terminal c. Similarly, a first terminal of switched capacitor circuit 22 can connect to node n2, and a second terminal of switched capacitor circuit 22 can connect to one terminal of magnetic element L2. The other terminal of magnetic element L2 can connect to positive output terminal c.

In this example, multi-level power conversion circuits 1 and 2 may be multi-level converters in the form of a buck topology. It should be noted that in other embodiments, multi-level power conversion circuits 1 and 2 may be multi-level converters in the form of boost, buck-boost, etc., such that the power converter can efficiently achieve a step-up or step-down function. In particular embodiments, multi-level power conversion circuits 1 and 2 may respectively include a magnetic element and a switched capacitor circuit. In addition, the particular connection arrangement of the magnetic element, the switched capacitor circuit, the first node (or the second node), and the positive output terminal may determine the topology of multi-level power conversion circuits 1 and 2.

In another example, one terminal of magnetic element L1 can connect to node n1, the other terminal of magnetic element L1 can connect to the first terminal of switched capacitor circuit 11, and the second terminal of switched capacitor circuit 11 can connect to positive output terminal c. One terminal of magnetic element L2 can connect to node n2, the other terminal of magnetic element L2 can connect to the first terminal of switched capacitor circuit 22, while the second terminal of switched capacitor circuit 22 can connect to positive output terminal c. In this particular case, multilevel power conversion circuits 1 and 2 are multi-level converters in the form of a boost topology. It should be understood that multi-level power conversion circuits 1 and 2 are taken as in the form of a buck topology, for example, in the following description.

Switched capacitor circuit 11 can include power switches Q11-Q13 connected in series and flying capacitor C11. Here, power switches Q11-Q13 can be sequentially connected in series between node n1 and the ground to form intermediate nodes m11 and m12. Flying capacitor C11 can connect between node n1 and intermediate node m12. The second terminal of switched capacitor circuit 11 can be the "first" intermediate node m11, which can be coupled to one terminal of magnetic element L1. In this example, switched capacitor circuit 21 can include power switches Q21 to Q23 and flying capacitor C21. Here, power switches Q21 to Q23 may be sequentially connected in series between node n2 and the ground to form intermediate nodes m21 and m22. Flying capacitor C21 can connect between node n2 and intermediate node m22, and the second terminal of switched capacitor circuit 21 may be intermediate node m21, which can connect to one terminal of magnetic element L2. Optionally, the power converter can include output capacitor Co connected between positive output terminal c and negative output terminal d, and in parallel with the load, in order to filter output voltage Vout.

In this example, the power converter can also include a control circuit for controlling the switching states of each power switch, such that the switching states of power switches Q1 and Q3 are the same, and the duty cycles are both D. Also, the switching states of power switches Q2 and Q4 can be the same, and the duty cycles both D power switches Q1 and Q2 can be under the phase-shifted control, and the phase difference between the turn-on moments of power switches Q1 and Q2 can be 180°. Similarly, the phase difference between the turn-on moments of power switches Q3 and Q4 can be 180°. Also, the phase difference between the turn-on moments of power switches Q21 and Q3 is $\alpha 1$, the switching states of power switches Q22 and Q21 may be complementary, and the switching states of power switches Q23 and Q3 can be complementary. In addition, the phase difference between the turn-on moments of power switches Q11 and Q2 is $\alpha 2$, the switching states of power switches Q12 and Q11 can be complementary, and the switching states of power switches Q13 and Q2 can be complementary. It should be noted that the phase differences $\alpha 1$ and $\alpha 2$ can be any suitable values, and in the following description, both $\alpha 1$ and $\alpha 2$ are 180° as just one example.

Figure 3:
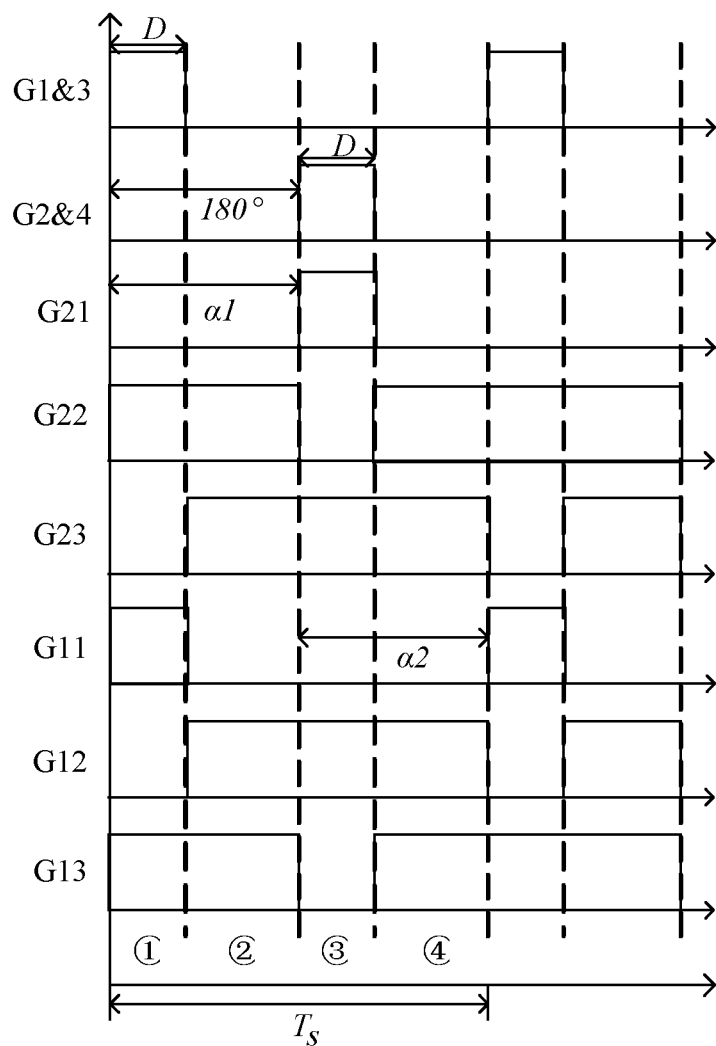
FIG. 3 is a waveform diagram of example control signals for controlling the first example power converter, in accordance with embodiments of the present invention.

Referring now to FIG. 3, shown is a waveform diagram of example control signals for controlling the first example power converter, in accordance with embodiments of the present invention. G1 and G3 are the control signals for power switches Q1 and Q3, G2 and G4 are the control signals for power switches Q2 and Q4, G21 is the control signal for power switch Q21, G22 the control signal for power switch Q22, G23 is the control signal for sixth power switch Q23, G11 is the control signal for power switch Q11, G12 is the control signal for power switch Q12, and G13 is the control signal for power switch Q13.

Figure 4A:
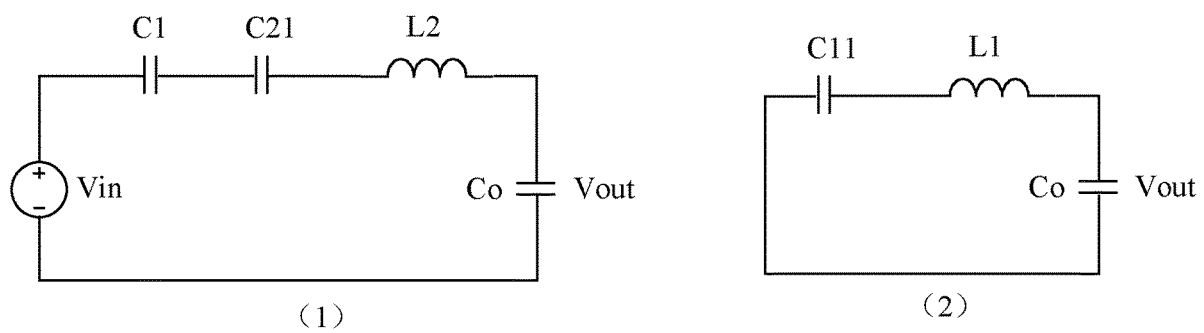
FIGS. 4A-4C are schematic diagrams of the first example power converter in each stage, in accordance with embodiments of the present invention.
Figure 4B:
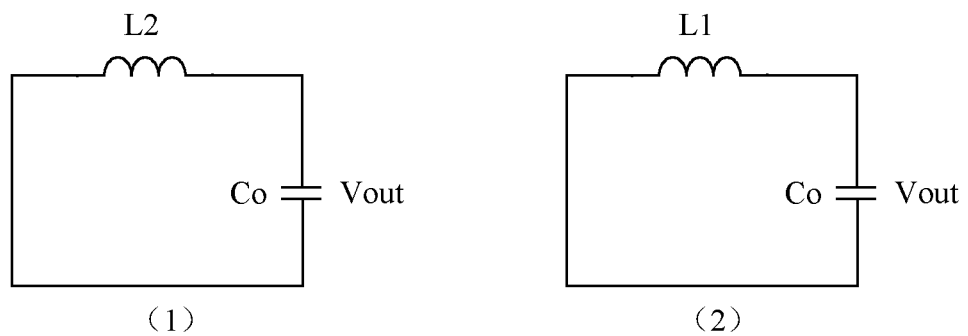
Figure 4C:
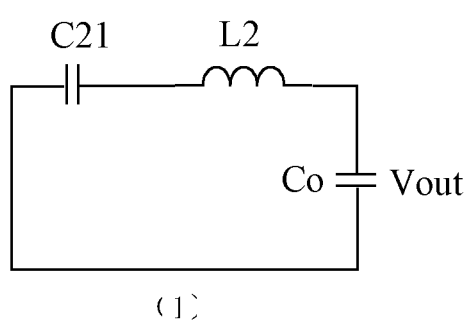
Figure 4C:
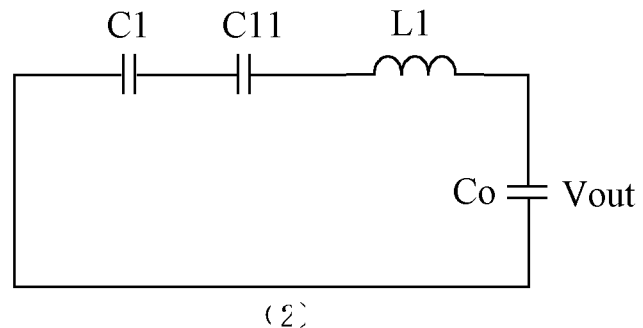

Referring now to FIGS. 4A-4C, shown are schematic diagrams of the first example power converter in each stage, in accordance with embodiments of the present invention. The operation process of the first example power converter is described as follows with reference to FIG. 3 and FIGS. 4A-4C. As shown in FIG. 3, in interval ①, control signals G1, G3, and G22 are at high levels, and thus power switches Q1, Q3, and Q22 can be turned on. At this time, the first conduction path is: Vin-Q1-C1-Q3-C21-Q22-L2-load-Vin (negative), and the equivalent circuit diagram is shown in (1) of FIG. 4A. In this stage, input voltage Vin may supply power to the load through energy storage element C1, flying capacitor C21, and magnetic element L2, and voltage VL2 across magnetic element L2 can be: Vin-VC1-VC21-Vout. In addition, in interval ①, control signals G11 and G13 are at high levels, and thus power switches Q11 and Q13 can be turned on. Then, the second conduction path can be: C11-Q11-L1-load-Q13-C11, and the equivalent circuit diagram is shown in (2) of FIG. 4A. The flying capacitor C11 can supply power to the load through magnetic element L1, and voltage VL1 across magnetic element L1 can be: VC11-Vout.

In interval ②, control signals G22 and G23 are at high levels, and thus power switches Q22 and Q23 can be turned on. At this time, the first conduction path is: L2-load-Q23-Q22-L2, and the equivalent circuit diagram is shown in (1) of FIG. 4B. During this stage, magnetic element L2 can freewheel to supply power to the load, and voltage VL2 across magnetic element L2 can be: −Vout. In addition, in interval ②, control signals G12 and G13 are at high levels, and thus power switches Q12 and Q13 may be on. Then, the second conduction path can be: L1-load-Q13-Q12-L1, and the equivalent circuit diagram is shown in (2) of FIG. 4B. At this time, magnetic element L1 may continue to supply power to the load, and voltage VL1 across magnetic element L1 can be: −Vout.

In interval ③, control signals G21 and G23 are at high levels, and thus power switches Q21 and Q23 may be turned on. At this time, the second conduction path can be: C21-

Q21-L2-load-Q23-C21, and the equivalent circuit diagram is shown in (1) of FIG. 4C. During this stage, flying capacitor C21 can supply power to the load through magnetic element L2, and voltage VL2 across magnetic element L2 can be: VC21-Vout. In addition, in interval ③, control signals G2, G4, and G12 are at high levels, and thus power switches Q2, Q4, and Q12 may be turned on. Thus, the first conduction path can be: C1-Q2-C11-Q12-L1-load-Q4-C1, and the equivalent circuit diagram is shown in (2) of FIG. 4C. During this stage, energy storage element C1 may supply power to the load through flying capacitor C11 and magnetic element L1, and voltage VL1 across magnetic element L1 can be: VC1-VC11-Vout.

In interval ④, control signals G22 and G23 are at high levels, and thus power switches Q22 and Q23 can be turned on. Thus, the first conduction path is: L2-load-Q23-Q22-L2, and the equivalent circuit diagram is shown (1) of in FIG. 4B. During this stage, magnetic element L2 can freewheel to supply power to the load, and voltage VL2 across magnetic element L2 can be: −Vout. In addition, in interval ④, control signals G12 and G13 are at high levels, and thus power switches Q12 and Q13 may be turned on. Thus, the second conduction path is: L1-load-Q13-Q12-L1, and the equivalent circuit diagram is shown in (2) of FIG. 4B. During this stage, magnetic element L1 can continue to supply power to the load, and voltage VL1 across magnetic element L1 may be: −Vout.

As described above, the intervals ① to ④ may form the whole operation cycle, and in each operation cycle, magnetic elements L1 and L2 can respectively satisfy the volt-second balance. For magnetic element L1, it can be obtained by:

$$D(VC1 - VC11 - Vout) + D(VC11 - Vout) + (1 - 2D)(-Vout) = 0 \quad (1)$$

For magnetic element L2, it can be obtained by:

$$(Vin - VC1 - VC21 - Vput) + D(VC21 - Vout) + (1 - 2D)(-Vout) = 0 \quad (2)$$

Based on equations (1) and (2), it can be acquired by: Vout=1/2*D*Vin. In this example, output voltage Vout can be equal to 1/2*D*Vin, and D≤1/2. When D=1/2, the power converter may efficiently perform the voltage conversion of 4:1; that is, the ratio of input voltage Vin to output voltage Vout is 4:1. Also, there may only be three power switches connected in series in this example, so the number of power switches coupled in series is reduced as compared with other power converter examples that require 8 power switches to be coupled in series, thereby making the implementation of the driving circuit simpler and reducing the circuit cost.

Further, voltage VC21 across flying capacitor C21 can be controlled to be equal to output voltage Vout (e.g., 1/2*D*Vin) by adjusting phase difference α1. At this time, the ripple of the current flowing through magnetic element L2 may be zero. Also, voltage VC11 across flying capacitor C11 can be controlled to be equal to output voltage Vout (e.g., 1/2*D*Vin) by adjusting phase difference α2. At this time, the ripple of the current flowing through magnetic element L1 may be zero. When voltage VC21 across flying capacitor C21 and voltage VC11 across flying capacitor C11 are both equal to output voltage Vout, the power converter in this example can achieve voltage conversion with zero inductor current ripple, thereby further improving the efficiency of the power converter.

Figure 5:
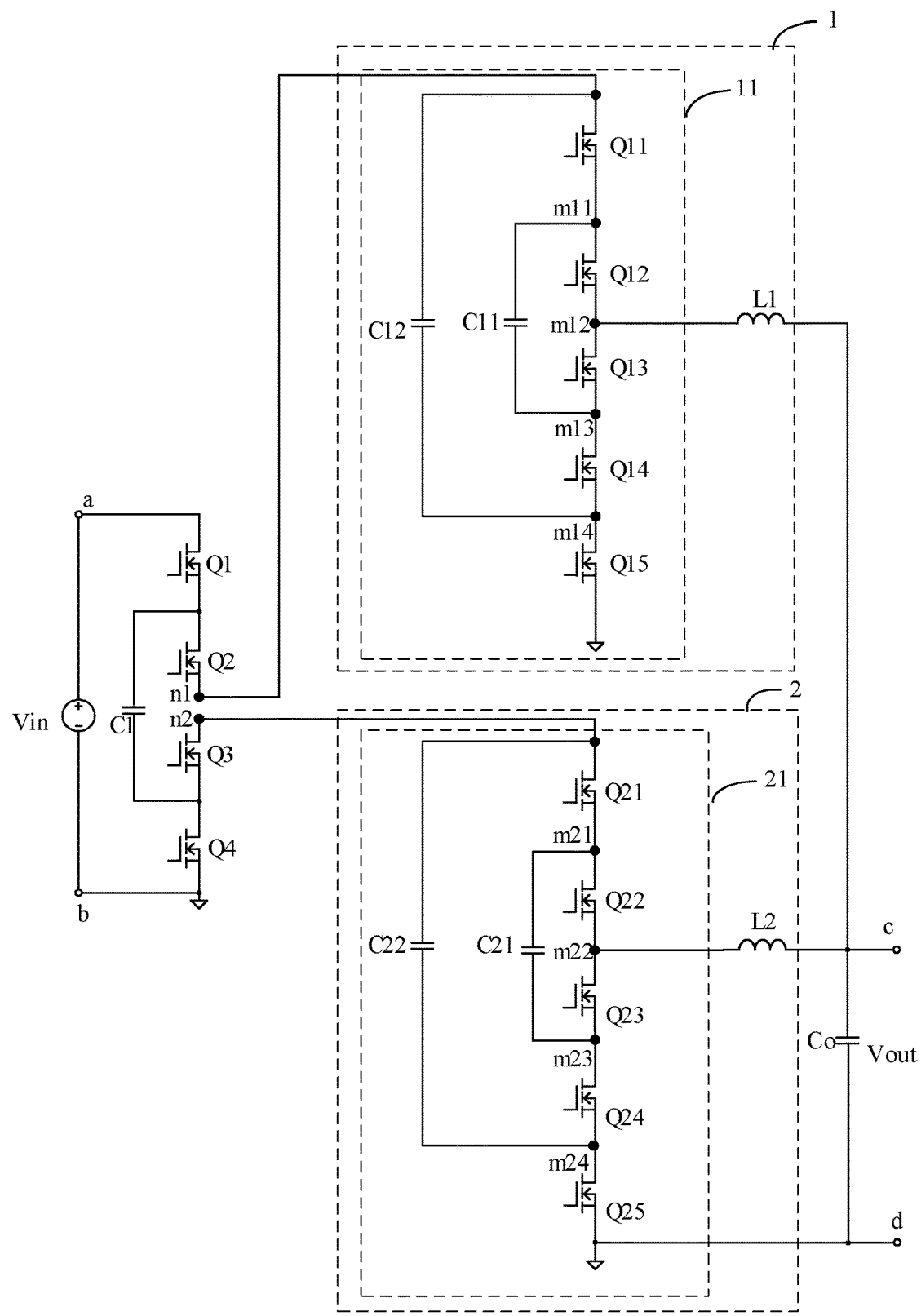
FIG. 5 is a schematic diagram of a second example power converter, in accordance with embodiments of the present invention.

Referring to FIG. 5, shown is schematic diagram of a second example power converter, in accordance with embodiments of the present invention. The difference versus the first example is that the structures of switched capacitors 11 and 22 are different here. For example, switched capacitor circuit 11 can include power switches Q11 to Q15 sequentially connected in series between node n1 and the ground, thereby forming intermediate nodes m11-m14. Switched capacitor circuit 11 can also include flying capacitors C11 and C12, where flying capacitor C11 can connect to intermediate nodes m11 and m13, flying capacitor C12 can connect between node n1 and intermediate node m14, and the second terminal of switched capacitor circuit 11 is intermediate node m12, which can connect to one terminal of magnetic element L1. Also, switched capacitor circuit 21 can include power switches Q21-Q25 sequentially connected in series between node n2 and the ground, thereby forming four intermediate nodes m21-m24. Switched capacitor circuit 21 can also include flying capacitors C21 and C22, where flying capacitor C21 can connect between intermediate nodes m21 and m23, flying capacitor C22 can connect between node n2 and intermediate node m24, and the second terminal of switched capacitor circuit 21 is intermediate node m22, which can connect to one terminal of magnetic element L2.

In this example, the power converter can also include a control circuit for controlling the switching states of each power switch, such that the switching states of power switches Q1 and Q3 are the same, and the duty cycles are both D. The switching states of power switches Q2 and Q4 can be the same, the duty cycles are both D, and power switches Q1 and Q2 may be under the phase-shifted control. For example, the phase difference between the turn-on moments of power switch Q1 (or power switch Q3) and power switch Q2 (or power switch Q4) is 120°. Also, the phase difference between the turn-on moments of power switches Q21 and Q3 is α1, and the phase difference between turn-on moments of power switch Q22 and the first power switch Q21 is α2.

The switching states of power switches Q23 and Q22 may be complementary, the switching states of power switches Q24 and Q21 can be complementary, and the switching states of power switches Q25 and Q3 may be complementary. In addition, the phase difference between the turn-on moments of power switches Q11 and Q2 is α3, the phase difference between the turn-on moments of power switches Q12 and Q11 is α4. The switching states of power switches Q13 and Q12 can be complementary, the switching states of power switches Q14 and Q11 may be complementary, and the switching states of power switches Q15 and Q2 can be complementary. Here for example, phase differences α1, α2, α3, and α4 are all 120°.

Figure 6:
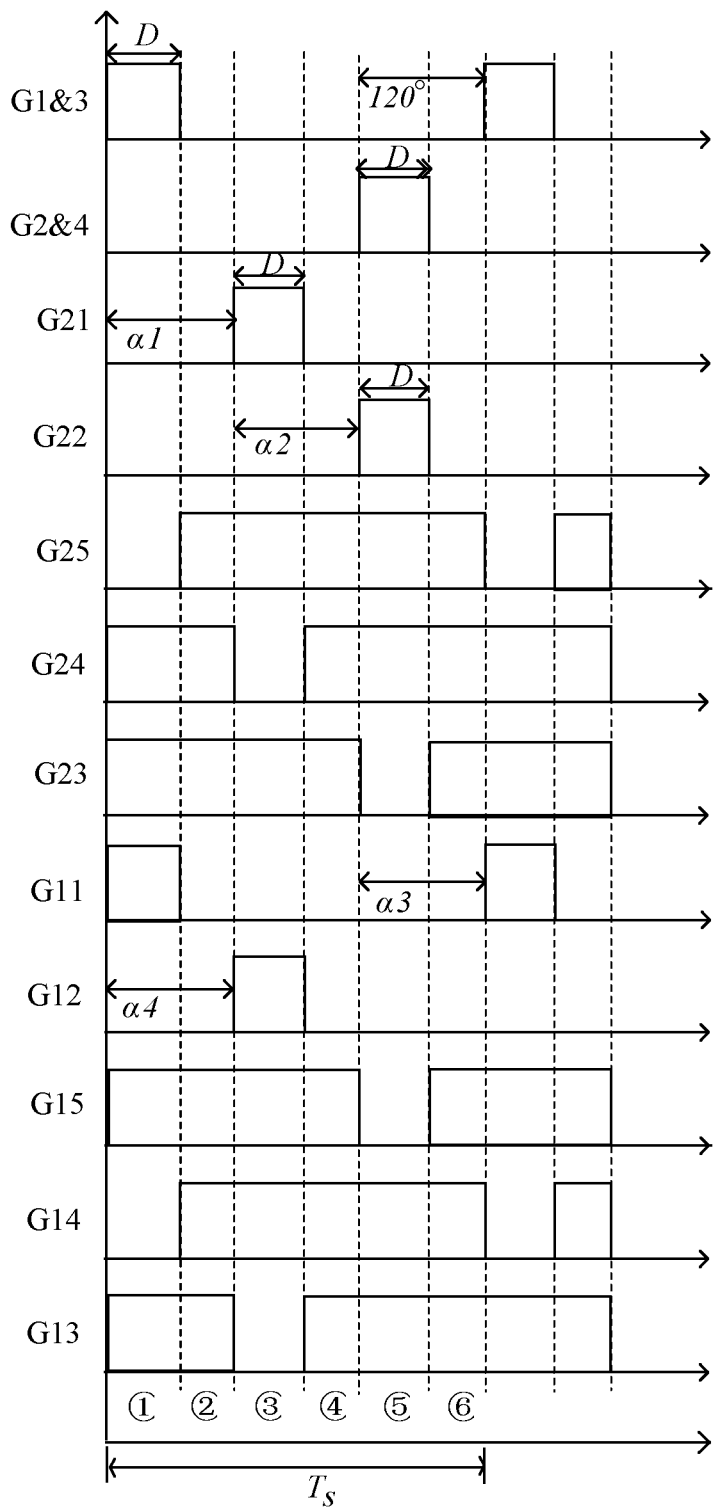
FIG. 6 is a waveform diagram of example control signals for controlling the second example power converter, in accordance with embodiments of the present invention.
Figure 7A:
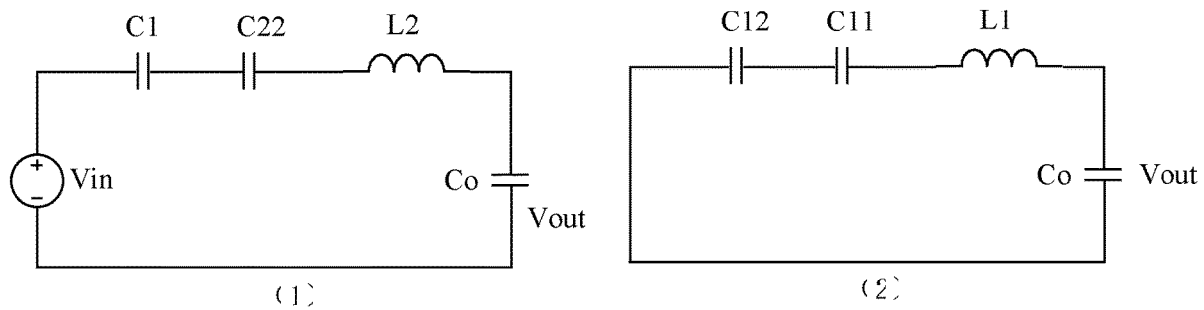
FIGS. 7A-7D are schematic diagrams of the second example power converter in each stage, in accordance with embodiments of the present invention.
Figure 7B:
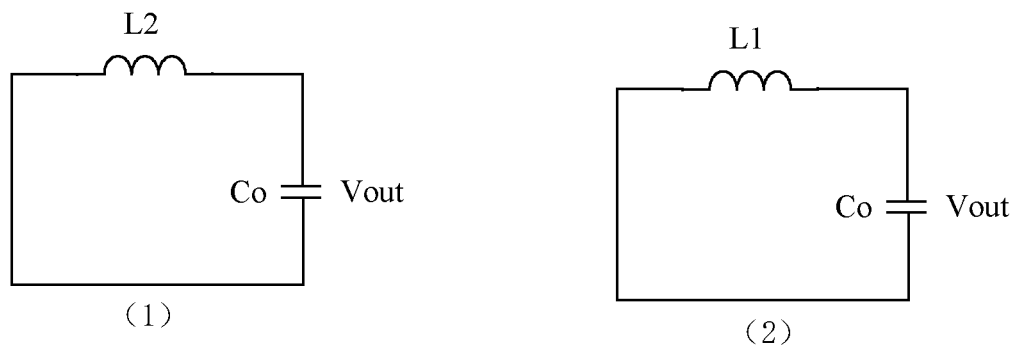
Figure 7C:
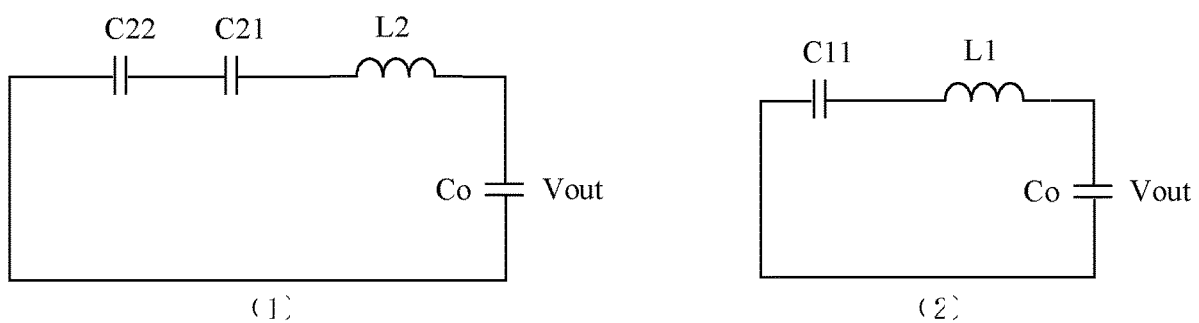
Figure 7D:
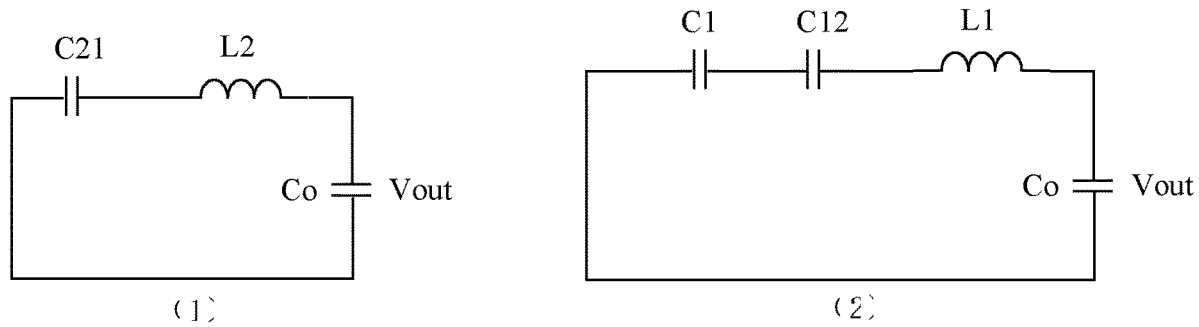

Referring now to FIG. 6, shown is a waveform diagram of example control signals for controlling the second example power converter, in accordance with embodiments of the present invention. Here, G1 and G3 are the control signals for controlling power switches Q1 and Q3, G2 and G4 are the control signals for controlling power switches Q2 and Q4, G21-G25 are the control signals for controlling power switches Q21-Q25, and G11-G15 are the control signals for controlling power switches Q11-Q15.

Referring now to FIGS. 7A-7D, shown are schematic diagrams of the second example power converter in each stage, in accordance with embodiments of the present invention. The operation process of the second example power converter is illustrated as follows with reference to FIG. 6 and FIGS. 7A-7D. As shown in FIG. 6, in interval ①, control signals G1 and G3, G24, and G23 are at high levels, and thus power switches Q1, Q3, Q23, and Q24 can be turned on. At this time, the first conduction path can be: Vin-Q1-C1-Q3-C22-Q24-Q23-L2-load-Vin (negative), and the equivalent circuit diagram is shown in (1) of FIG. 7A. During this stage, input voltage Vin can supply power to the load through energy storage element C1, flying capacitor C22, and magnetic element L2. Thus, voltage VL2 across magnetic element L2 can be: Vin-VC1-VC22-Vout. In addition, in interval ①, control signals G11, G15 and G13 are high levels, and thus power switches Q11, Q13, and Q15 may be turned on. Thus, the second conduction path can be: C12-Q11-C11-Q13-L1-load-Q15-C12, and the equivalent circuit diagram is shown in (2) of FIG. 7A. During this stage, flying capacitor C12 can supply power to the load through flying capacitor C11 and magnetic element L1, and voltage VL1 across magnetic element L1 can be: VC12-VC11-Vout.

In interval ②, control signals G25, G24, and G23 are at high levels, and thus sixth power switches Q23, Q24, and Q25 may be turned on. Thus, the first conduction path can be: L2-load-Q25-Q24-Q23-L2, and the equivalent circuit diagram is shown in (1) of FIG. 7B. During this stage, magnetic element L2 can freewheel to supply power to the load, and voltage VL2 across magnetic element L2 can be: −Vout. In addition, in interval ②, control signals G15, G14 and G13 are high levels, and thus power switches Q13, Q14, and Q15 may be turned on. Thus, the second conduction path can be: L1-load-Q15-Q14-Q13-L1, and its equivalent circuit diagram is shown in (2) of FIG. 7B. During this stage, magnetic element L1 can freewheel to supply power to the load, and voltage VL1 across magnetic element L1 can be: −Vout.

In interval ③, control signals G21, G23 and G25 are at high levels, and thus power switches Q21, Q23 and Q25 may be turned on. Thus, the first conduction path can be: C22-Q21-C21-Q23-L2-Load-Q25-C22, and the equivalent circuit diagram is shown in (1) of FIG. 7C. During this stage, flying capacitor C22 can supply power to the load through flying capacitor C21 and magnetic element L2, and voltage VL2 across magnetic element L2 can be: VC22-VC21-Vout. In addition, in interval ③, control signals G12, G14, G15 are at high levels, and thus power switches Q12, Q14, and Q15 may be turned on. Thus, the second conduction path can be: C11-Q12-L1-load-Q15-Q14-C11, and the equivalent circuit diagram is shown in (2) of FIG. 7C. During this stage, flying capacitor C11 may supply power to the load through magnetic element L1, and voltage VL1 across magnetic element L1 can be: VC11-Vout.

In interval ④, control signals G25, G24, and G23 are at high levels, and thus power switches Q23, Q24, and Q25 may be turned on. Thus, the first conduction path can be: L2-load-Q25-Q24-Q23-L2, and the equivalent circuit diagram is shown in (1) of FIG. 7B. During this stage, magnetic element L2 can freewheel to supply power to the load, and voltage VL2 across magnetic element L2 can be: −Vout. In addition, in interval ④, control signals G15, G14 and G13 are high levels, and thus power switches Q13, Q14, and Q15 may be turned on. Thus, the second conduction path can be: L1-load-Q15-Q14-Q13-L1, and the equivalent circuit diagram is shown in of (2) of FIG. 7B. During this stage, magnetic element L1 can freewheel to supply power to the load, and voltage VL1 across magnetic element L1 can be: −Vout.

In interval ⑤, control signals G22, G24, G25 are at high levels, and sixth power switches Q22, Q24, and Q25 may be turned on. Thus, the first conduction path can be: C21-Q22-L2-load-Q25-Q24-C21, and the equivalent circuit diagram is shown in (1) of FIG. 7D. During this stage, flying capacitor C21 can supply power to the load through magnetic element L2, and voltage VL2 across magnetic element L2 can be: VC21-Vout. In addition, in interval ⑤, control signals G2, G4, G13, and G14 are high levels, and thus power switches Q2, Q4, Q13, and Q14 may be turned on. Thus, the second conduction path can be: C1-Q2-C12-Q14-Q13-L1-load-Q4-C1, and the equivalent circuit diagram is shown in (2) of FIG. 7D. During this stage, energy storage element C1 can supply power to the load through flying capacitor C12 and magnetic element L1, and voltage VL1 across magnetic element L1 can be: VC1-VC12-Vout.

In interval ⑥, control signals G25, G24, and G23 are at high levels, and thus sixth power switches Q23, Q24, and Q25 may be turned on. Thus, the first conduction path can be: L2-load-Q25-Q24-Q23-L2, and the equivalent circuit diagram is shown in (1) of FIG. 7B. During this stage, magnetic element L2 may freewheel to supply power to the load, and voltage VL2 across magnetic element L2 can be: −Vout. In addition, in interval ⑥, control signals G15, G14, and G13 are high levels, and thus power switches Q13, Q14, and Q15 may be turned on. Thus, the second conduction path can be: L1-load-Q15-Q14-Q13-L1, and the equivalent circuit diagram is shown in (2) of FIG. 7B. During this stage, magnetic element L1 may freewheel to supply power to the load, and voltage VL1 across magnetic element L1 can be: −Vout.

As described above, the intervals ① to ⑥ may form the whole operation cycle, and in each operation cycle, magnetic elements L1 and L2 may respectively satisfy the volt-second balance. For magnetic element L1, it can be obtained by:

$$D(VC1 - VC12 - Vout) + D(VC11 - Vout) + \qquad (3)$$
$$D(VC12 - VC11 - Vout) + (1 - 3D)(-Vout) = 0$$

For magnetic element L2, it can be obtained by:

$$D(Vin - VC1 - VC22 - Vout) + D(VC22 - VC21 - Vout) + \qquad (4)$$
$$D(VC21 - Vout) + (1 - 3D)(-Vout) = 0$$

Based on equations (3) and (4), it can be acquired by: Vout=1/2*D*Vin. In this example, output voltage Vout can be equal to 1/2*D*Vin, and D<1/3. When D=1/3, the power converter can efficiently perform the voltage conversion of 6:1; that is, the ratio of input voltage Vin to output voltage Vout is 6:1. Also, there may only be 5 power switches connected in series, so the number of power switches coupled in series is reduced, thereby simplifying implementation of the driving circuit.

Further, voltage VC21 across flying capacitor C21 can be controlled to be equal to output voltage Vout (e.g., 1/2*D*Vin) by adjusting phase difference α1 and α2. At this time, the ripple of the current flowing through magnetic element L2 may be zero. Also, voltage VC11 across flying capacitor C11 can be controlled to be equal to output voltage Vout (e.g., 1/2*D*Vin) by adjusting phase difference α3 and α4. At this time, the ripple of the current flowing through magnetic element L1 may be zero. For example, the voltages across flying capacitors C21 and C22 can be controlled by adjusting phase differences α1 and α2, such that voltage VC21 across flying capacitor C21 may be controlled to be equal to output voltage Vout (e.g., 1/2*D*Vin). In addition, voltage VC22 across flying capacitor C22 can be controlled to be equal to twice the output voltage (e.g., D*Vin). At this time, the ripple of the current flowing through magnetic element L2 may be zero.

Also, the voltages across flying capacitors C11 and C12 can be controlled by adjusting phase difference α3 and α4, such that voltage VC11 across flying capacitor C11 is controlled to be equal to output voltage Vout (e.g., 1/2*D*Vin), and voltage VC12 across flying capacitor C12 can be controlled to be equal to twice the output voltage (e.g., D*Vin). At this time, the ripple of the current flowing through magnetic element L1 may be zero. When voltage VC21 across flying capacitor C21, and voltage VC11 across flying capacitor C11, are both equal to output voltage Vout, the power converter in this example can achieve voltage conversion with zero inductor current ripple, thereby further improving the efficiency of the power converter.

Figure 8:
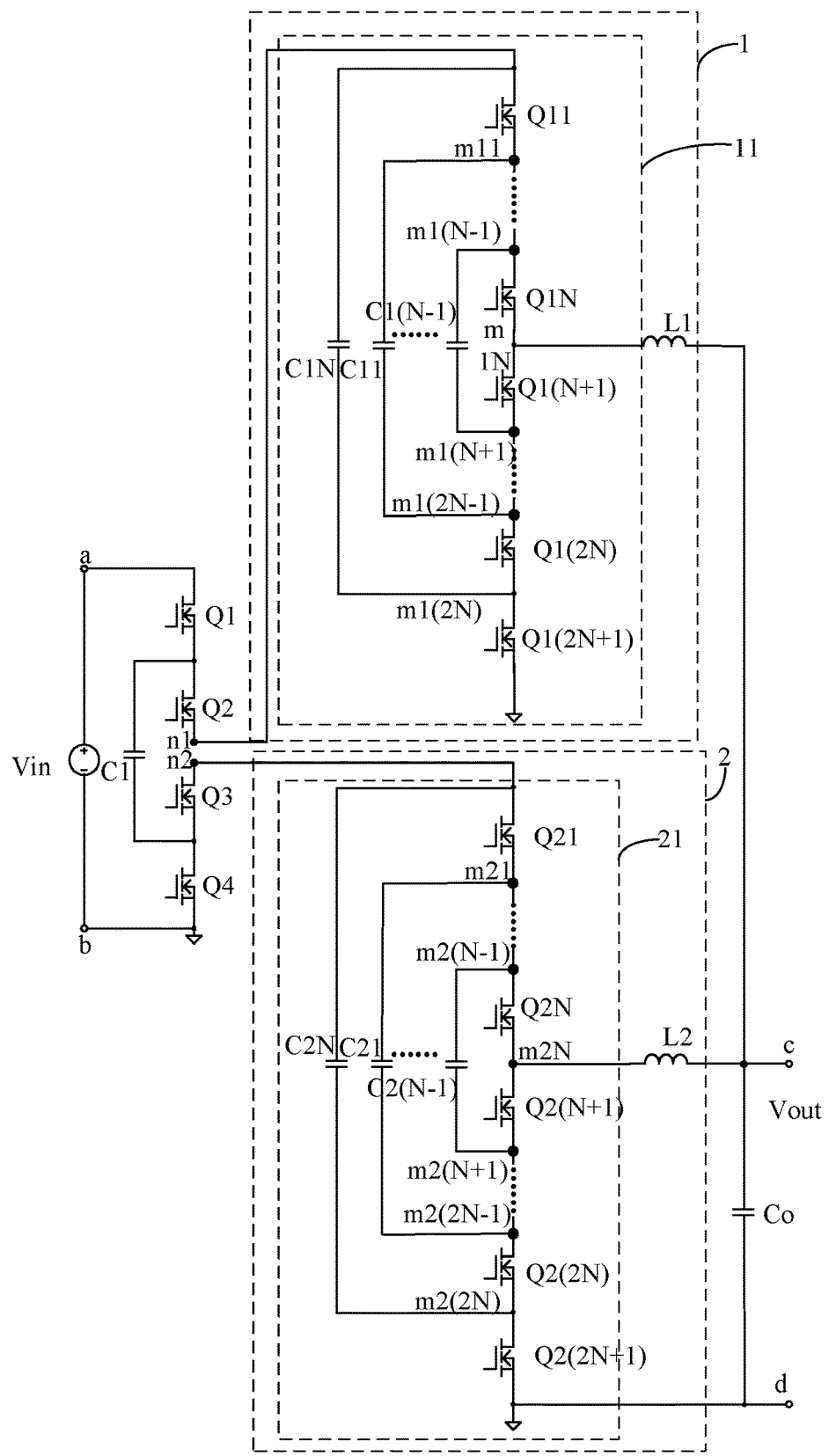
FIG. 8 is schematic diagram of a third example power converter, in accordance with embodiments of the present invention.

Referring now to FIG. 8, shown is a schematic diagram of a third example power converter, in accordance with embodiments of the present invention. The difference from the first example is that the structures of switched capacitors 11 and 22 are different. In this particular example, switched capacitor circuit 11 can include (2N+1) power switches Q11-Q1(2N+1) sequentially connected in series between node n1 and the ground, thereby forming 2N "first" intermediate nodes m11-m1(2N). Also, switch capacitor circuit 11 can include N flying capacitors C11-C1N, where the Nth flying capacitor C1N can connect between node n1 and intermediate node m1(2N), and the r-th flying capacitor can connect between the r-th intermediate node m1r and the (2N-r)th intermediate node m1(2N-r). Also, the second terminal of switched capacitor circuit 11 can be the Nth intermediate node m1N, where r is less than N, and r and N are both positive integers.

Switched capacitor circuit 21 can also include (2N+1) power switches Q11-Q1(2N+1) sequentially connected in series between node n2 and the ground, thereby forming 2N intermediate nodes m21-m2(2N). In addition, switched capacitor circuit 21 can include N flying capacitors C21-C2N, where the Nth flying capacitor C2N can connect between node n1 and the 2Nth intermediate node m2(2N), and the r-th flying capacitor can connect between the r-th intermediate node m2r and the (2N-r)th intermediate node m2(2N-r). Also, the second terminal of switched capacitor circuit 21 can be the Nth "second" intermediate node m2N, where r is less than N, and r and N are both positive integers.

In this example, the power converter can also include a control circuit for controlling the switching states of each power switch, such that the switching states of power switches Q1 and Q3 are the same, and the duty cycles are both D. The switching states of power switches Q2 and Q4 can be the same, and the duty cycles are both D, and power switches Q1 and Q2 may be under the phase-shifted control. For example, the phase difference between the turn-on moments of power switch Q1 (or power switch Q3) and power switch Q2 (or power switch Q4) is 360°/(N+1). For example, the duty cycles of the power switches Q1, Q2, Q3, Q4, the "first" N "fifth" power switches, and the "first" N "sixth" power switches may be the same.

Further, every two adjacent power switches among power switch Q3 and the first to the Nth sixth power switches Q21-Q2N can be under phase-shifted control. For example, the phase difference between the turn-on moments of power switches Q21 and Q3 is α1, the phase difference between turn-on moments of the i-th sixth power switch Q2i and the (i−1)-th sixth power switch Q2(i−1) is αi, where i is greater than 1 and not greater than N, such that the phase differences between every two adjacent power switch are respectively α1, α2, ..., αN. Also, the switching states of the (2N+1)th sixth power switch Q2(2N+1) and power switch Q3 can be complementary, and the switching states the (2N-n+1) sixth power switch Q2(2N-n+1) and the n-th sixth power switch Q2n may be complementary, where n is not greater than N.

Similarly, every two adjacent power switches among power switch Q3 and the first to the Nth power switches Q21-Q2N can be under phase-shifted control, and the phase differences between every two adjacent power switch may respectively be α(N+1), α(N+2), ..., α(2N). The switching states of the (2N+1)th fifth power switch Q1(2N+1) and power switch Q2 can be complementary, and the switching states of the (2N-n+1)th power switch Q1(2N-n+1) and the n-th power switch Q1n may be complementary, where n is not greater than N. It can be easily understood that phase differences α1, α2, ..., α(2N) can be the same or different.

Similar to the first and second example power converters, it can be obtained that: Vout=1/2*D*Vin. In this embodiment, output voltage Vout can be equal to 1/2*D*Vin, D<1/(N+1). Therefore, the number of power switches coupled in series may be reduced, thereby making simplifying implementation of the driving circuit. Further, voltage VC2(N−1) across the (N−1)th second flying capacitor C2(N−1) can be controlled to be equal to output voltage Vout (e.g., 1/2*D*Vin) by adjusting phase differences α1, α2, ..., αN. At this time, the ripple of the current flowing through magnetic element L2 may be zero. Also, voltage VC1(N−1) across the (N−1)th flying capacitor C1(N−1) can be controlled to be equal to output voltage Vout (e.g., 1/2*D*Vin) by adjusting phase differences α(N+1), α(N+2), ..., α(2N), where N is greater than 1. At this time, the ripple of the current flowing through magnetic element L1 may be zero. For example, the voltage across each second flying capacitor can be controlled by controlling phase differences α1, α2, ..., αN, such that voltage VC2s across the s-th flying capacitor C2s is equal to Vout*$2^{(N-1-s)}$1/2*D*Vin*$2^{(N-1-s)}$, and voltage VC2N across the Nth flying capacitor C2N is equal to Vout*$2^{(N-1)}$, where s is less than N, and N is greater than 1. At this time, the ripple of the current flowing through magnetic element L2 may be zero.

Similarly, the voltage across each first flying capacitor can be controlled by controlling phase differences α(N+1), α(N+2), ..., α(2N). For example, voltage VC1s across the s-th first flying capacitor C1s may be equal to Vout*$2^{(N-1-s)}$, e.g 1/2*D*Vin*$2^{(N-1-s)}$, and voltage VC1N across the Nth first flying capacitor C1N can be equal to Vout*$2^{(N-1)}$, where s is less than N, and N is greater than 1. At this time, the ripple of the current flowing through magnetic element L1 may be zero. When N is greater than 1, voltage VC2(N−1) across the (N−1)th flying capacitor C2(N−1), and voltage VC1(N−1) across the (N−1)th flying capacitor C1(N−1), may both be equal to output voltage Vout. When N=1, voltage VC21 across flying capacitor C21, and voltage VC11 across flying capacitor C11, may both be equal to output voltage Vout, such that the power converter in this example can achieve voltage conversion with zero inductor current ripple, thereby further improving the efficiency of the power converter.

The embodiments were chosen and described in order to best explain the principles of the invention and its practical applications, to thereby enable others skilled in the art to best utilize the invention and various embodiments with modifications as are suited to particular use(s) contemplated.

It is intended that the scope of the invention be defined by the claims appended hereto and their equivalents.

What is claimed is:

1. A power converter, comprising:
    a) a positive input terminal and a negative input terminal, configured to receive an input voltage;
    b) a positive output terminal and a negative output terminal, configured to generate an output voltage;
    c) a first power switch and a second power switch, sequentially coupled in series between the positive input terminal and a first node;
    d) a third power switch and a fourth power switch, sequentially coupled in series between a second node and the negative input terminal, wherein there is no physical connection between the first node and the second node such that there is no direct connection between the second power switch and the third power switch;
    e) a first energy storage element coupled between a common terminal of the first power switch and the second power switch and a common terminal of the third power switch and the fourth power switch;
    f) a first multi-level power conversion circuit comprising a first magnetic element and a first switched capacitor circuit, wherein a first terminal of the first switched capacitor circuit is coupled to the first node, a second terminal of the first switched capacitor circuit is coupled to a first terminal of the first magnetic element, and a second terminal of the first magnetic element is coupled to the positive output terminal; and
    g) a second multi-level power conversion circuit comprising a second magnetic element, and being coupled between the first node and the positive output terminal.

2. The power converter of claim 1, wherein duty cycles of the first power switch, the second power switch, the third power switch, and the fourth power switch are the same.

3. The power converter of claim 1, wherein switching states of the first power switch and the third power switch are the same, switching states of the second power switch and the fourth power switch are the same, and the first power switch and the second power switch are under a phase-shifted control.

4. The power converter of claim 1, wherein the power converter is configured to adjust the output voltage of the power converter by adjusting a duty cycle of the first power switch.

5. The power converter of claim 4, wherein the output voltage of the power converter is configured to be proportional to a product of the duty cycle of the first power switch and the input voltage of the power converter.

6. The power converter of claim 1, wherein the second multi-level power conversion circuit comprises a second switched capacitor circuit, wherein a first terminal of the second switched capacitor circuit is coupled to the second node, a second terminal of the second switched capacitor circuit is coupled to a first terminal of the second magnetic element, and a second terminal of the second magnetic element is coupled to the positive output terminal.

7. The power converter of claim 6, wherein the first switched capacitor circuit comprises:
    a) (2N+1) fifth power switches sequentially connected in series between the first terminal of the first switched capacitor circuit and a ground, thereby forming 2N first intermediate nodes; and
    b) N first flying capacitors, wherein an Nth first flying capacitor is coupled between the first node and a 2Nth first intermediate node, and an r-th first flying capacitor is coupled between an r-th first intermediate node and a (2N−r)th first intermediate node, wherein the second terminal of the first switched capacitor circuit is an Nth first intermediate node, and wherein r and N are positive integers, and r is less than N.

8. The power converter of claim 7, wherein the second switched capacitor circuit comprises:
    a) (2N+1) sixth power switches sequentially connected in series between the first terminal of the second switched capacitor circuit and the ground, thereby forming 2N second intermediate nodes; and
    b) N second flying capacitors, wherein an Nth second flying capacitor is coupled between the second node and a 2Nth second intermediate node, and an r-th second flying capacitor is coupled between an r-th second intermediate node and a (2N−r)th second intermediate node, wherein the second terminal of the second switched capacitor circuit is an Nth second intermediate node.

9. The power converter of claim 8, wherein in a first operation state, the input voltage provides energy to a load through the second magnetic element, and the first flying capacitor provides energy to the load through the first magnetic element.

10. The power converter of claim 9, wherein in a second operation state, the first energy storage element provides energy to a load through the first magnetic element, and the second flying capacitor provides energy to the load through the second magnetic element.

11. The power converter of claim 10, wherein in a third operation state, the first magnetic element and the second magnetic element freewheel to release energy to a load.

12. The power converter of claim 11, wherein in a fourth operation state, the first flying capacitor provides energy to a load through the first magnetic element, and the second flying capacitor provides energy to the load through the second magnetic element.

13. The power converter of claim 8, wherein switching states of the first power switch and the third power switch are the same, switching states of the second power switch and the fourth power switch are the same, the first power switch and the second power switch are under a phase-shifted control, and a phase difference between turn-on moments of the first power switch and the second power switch is 360°/(N+1).

14. The power converter of claim 8, wherein duty cycles of the first power switch, the third power switch, the first N fifth power switches, the second power switch, the fourth power switch, and the first N sixth power switches are the same.

15. The power converter of claim 14, wherein every two adjacent power switches among the second power switch and the first to the Nth fifth power switches are controlled to be turned on with a corresponding phase difference, and each two adjacent power switches among the third power switch and the first to Nth sixth power switches are controlled to be turned on with a corresponding phase difference.

16. The power converter of claim 15, wherein:
    a) the phase differences between turn-on moments of every two adjacent power switches among the second power switch and the first to the Nth fifth power switches are controlled, such that when N is greater than 1, a voltage across an (N−1)th first flying capacitor is equal to the output voltage of the power converter; and b) when N=1, a voltage across the first flying capacitor is equal to the output voltage of the power converter.

17. The power converter of claim 15, wherein:
a) the phase differences between turn-on moments of every two adjacent power switches among the third power switch and the first to the Nth sixth power switches are controlled, such that when N is greater than 1, a voltage across an (N−1)th second flying capacitor is equal to the output voltage of the power converter; and
b) when N=1, a voltage across the second flying capacitor is equal to the output voltage of the power converter.

18. The power converter of claim 15, wherein:
a) the phase differences between turn-on moments of each two adjacent power switches among the third power switch and the first to the Nth sixth power switches are controlled, such that a voltage across an s-th first flying capacitor is equal to the product of the output voltage of the power converter and $2^{(N-1-s)}$, and a voltage across the Nth first flying capacitor is equal to the product of the output voltage of the power converter and $2^{(N-1)}$; and b) the phase difference between turn-on moments of the two adjacent power switches among the third power switch and the first to the Nth sixth power switches is controlled, such that the voltage across an s-th second flying capacitor is equal to the product of the output voltage of the power converter and $2^{(N-1-s)}$, and a voltage across the Nth second flying capacitor is equal to the product of the output voltage of the power converter and $2^{(N-1)}$, wherein s is less than N, and s and N are positive integers.

19. The power converter of claim 14, wherein switching states of a (2N+1)th fifth power switch and the second power switch are complementary, switching states of a (2N−n+1)th fifth power switch and an nth fifth power switch are complementary, switching states of a (2N+1)th sixth power switch and the third power switch are complementary, and switching states of a (2N−n+1)th sixth power switch and an nth sixth power switch are complementary, wherein n is a positive integer that is not greater than N.

* * * * *